No. 752,264. PATENTED FEB. 16, 1904.
J. W. SIMMONS.
MEAT CUTTER.
APPLICATION FILED APR. 21, 190
NO MODEL.
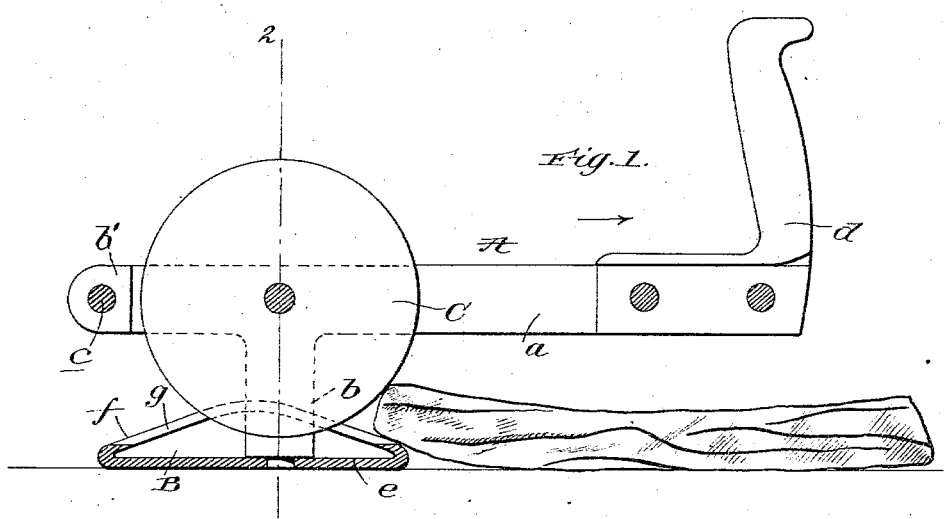
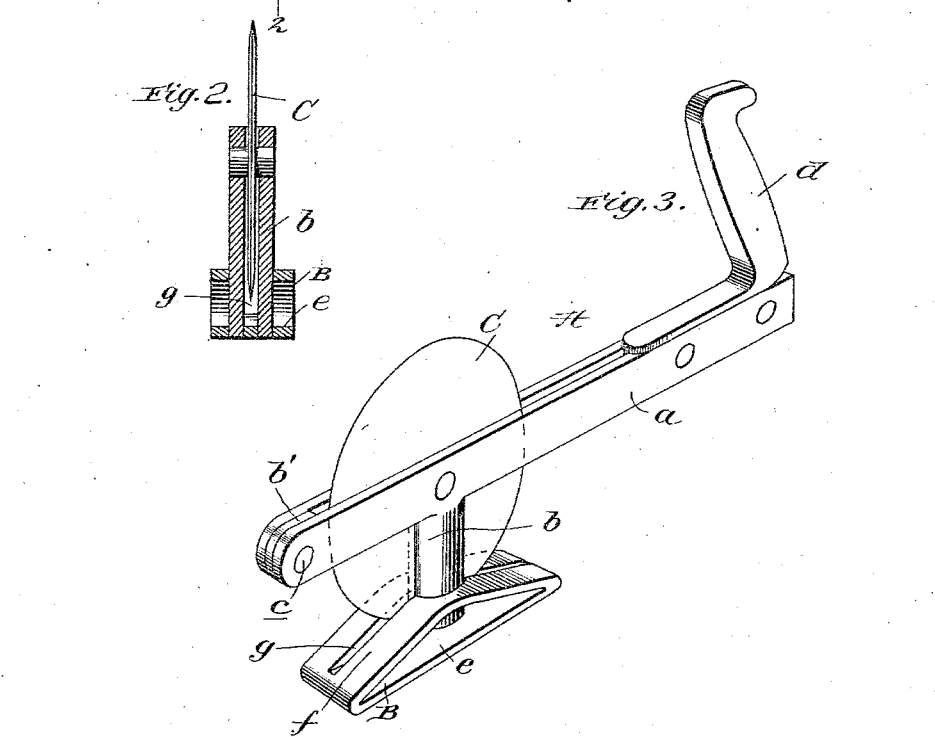
Witnesses
Inventor
J. W. Simmons
by James Shuhy
Attorney No. 752,264.

Patented February 16, 1904.

UNITED STATES PATENT OFFICE.

JESSE W. SIMMONS, OF OAK, TEXAS.

MEAT-CUTTER.

SPECIFICATION forming part of Letters Patent No. 752,264, dated February 16, 1904.

Application filed April 21, 1903. Serial No. 153,634. (No model.)

*To all whom it may concern:*

Be it known that I, JESSE W. SIMMONS, a citizen of the United States, residing at Oak, in the county of Ellis and State of Texas, have invented new and useful Improvements in Meat-Cutters, of which the following is a specification.

My invention pertains to meat-cutters of the hand type; and it has for its object to provide a simple and durable device through the medium of which sides of bacon may be expeditiously and neatly cut into slices with but a minimum amount of effort.

With the foregoing in mind the invention will be fully understood from the following description and claims when taken in connection with the accompanying drawings, in which—

Figure 1 is a longitudinal vertical section of the cutter constituting the preferred embodiment of my invention, the same being shown in proper position with respect to a piece of bacon to be cut. Fig. 2 is a transverse section taken in the plane indicated by the broken line 2 2 of Fig. 1. Fig. 3 is a perspective view of the cutter.

Similar letters designate corresponding parts in all of the views of the drawings, referring to which—

A is the body or main frame of the cutter. Said frame in the present and preferred embodiment of my invention is formed of steel or other suitable metal and comprises longitudinal bars $a$, having depending arms $b$ at an intermediate point of their length, a spacing-piece $b'$, secured between said bars at one end thereof by a rivet $c$, and a handle $d$, secured between the bars at the opposite end of the same.

B is a runner, preferably of metal, fixedly connected to the lower ends of the arms $b$ and designed to bear and slide on a table, counter, or other support on which bacon is to be cut. The runner has a horizontal lower side $e$; but its upper side $f$ is inclined downwardly from its middle to its opposite ends—this in order to enable it to readily pass under a side of bacon when it is pushed or pulled against the edge of the same.

C is the circular knife of the cutter, which is mounted in the frame A so as to freely rotate between both the bars $a$ and the arms $b$ thereof and in a slot $g$ of the runner B. Because of the circular form of the knife and its ability to freely rotate in the frame it is adapted to be easily pushed or pulled through a side of bacon to cut the same into slices. The circular form of the knife is also advantageous because it affords a very long cutting edge and one which will become dull and wear uniformly throughout its length. From this it follows that the cutter may be continuously used for a long period without the necessity of sharpening the knife.

In using my improved cutter the side of bacon to be cut is nailed or otherwise fastened, skin side down, on a table or other support, and the cutter is placed as shown in Fig. 1 and drawn in the direction indicated by arrow. When the cutter is thus drawn or pulled, the runner B will bear and move on the support and will pass below the piece of bacon and hold the same up to the edge of the knife, which latter will cut through the bacon in such manner as to leave the edges of the slice and the uncut portion smooth.

When desirable, my improved cutter may be pushed instead of pulled through a side of bacon, and it is because of this that I incline the upper side of the runner B downwardly from its middle to its opposite ends. In this connection I desire it understood that the upper side of runner B may be inclined downwardly from its middle to one of its ends when preferred without involving a departure from the scope of my invention.

It will be appreciated from the foregoing that notwithstanding its simplicity and cheapness my improved cutter is calculated to enable a person to quickly reduce a side of bacon to slices with but little effort; also, that the cutter is strong and durable and embodies no parts that are liable to get out of order after a short period of use.

I have entered into a detailed description of the construction and relative arrangement of the parts embraced in the present and preferred embodiment of my invention in order to impart a full, clear, and exact understanding of the same. I do not desire, however, to be understood as confining myself to such specific construction and relative arrangement of parts, as such changes or modifications may be made in practice as fairly fall within the scope of my invention as claimed.

Having described my invention, what I claim, and desire to secure by Letters Patent, is—

1. A meat-cutter comprising a frame or body made up of longitudinal bars, connected together with a space between them, and having depending arms, at an intermediate point of their length, a handle connected to said bars, a runner connected to the lower ends of the arms of the bars, and having its upper side inclined downwardly toward one of its ends, and also having a longitudinal slot in said upper side, and a rotary, circular knife carried by the body, and arranged between the longitudinal bars and also between the arms on said bars, and extending down into and adapted to turn in the slot of the runner.

2. A meat-cutter, comprising a frame or body made up of longitudinal bars, connected together with a space between them, and having depending arms, at an intermediate point of their length, a handle connected to said bars at one end thereof, a runner connected to the lower ends of the arms of the bars, and having a longitudinal slot in its upper side, and a rotary, circular knife carried by the body, and arranged between the longitudinal bars and also between the arms on said bars, and in the slot of the runner.

In testimony whereof I have hereunto set my hand in presence of two subscribing witnesses.

JESSE W. SIMMONS.

Witnesses:
 JAMES N. NEWMAN,
 GENERAL L. BATES.